Patented Jan. 25, 1944

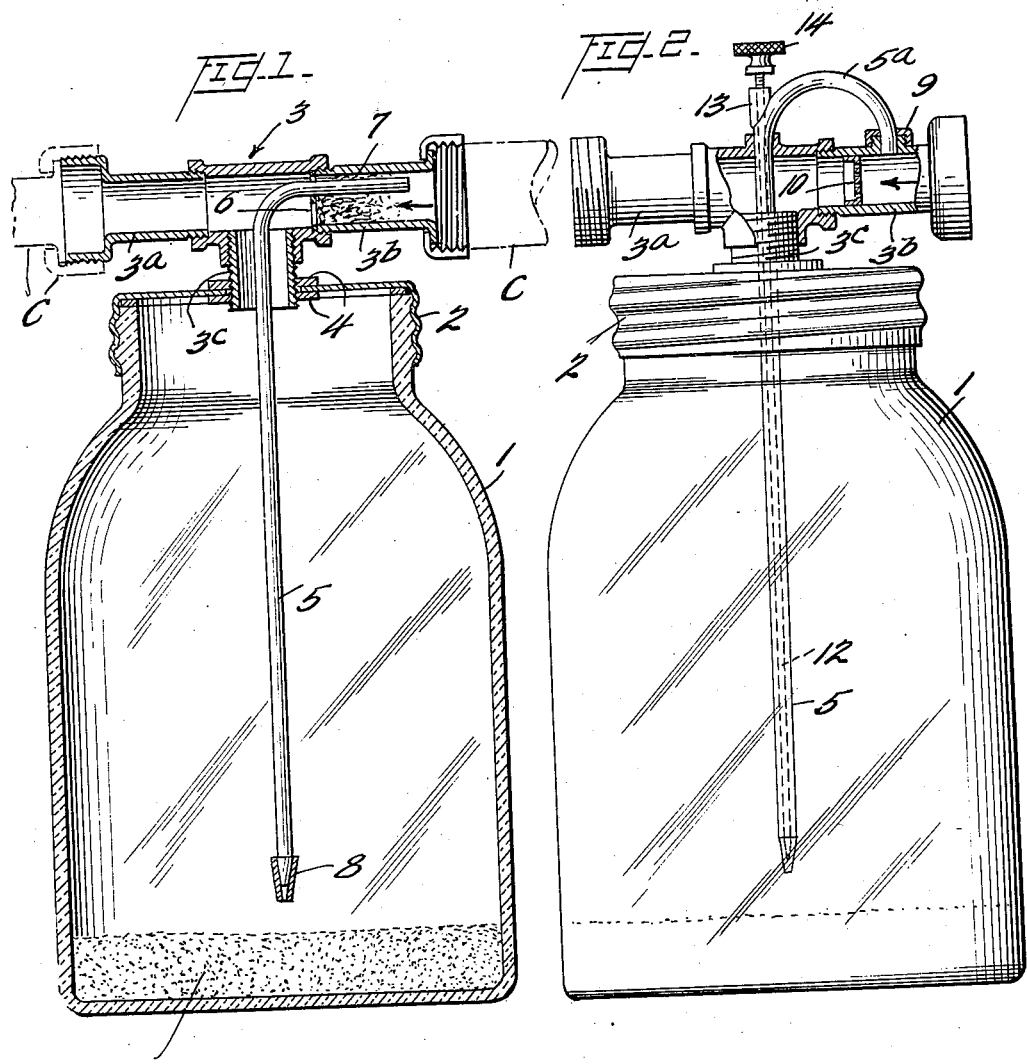
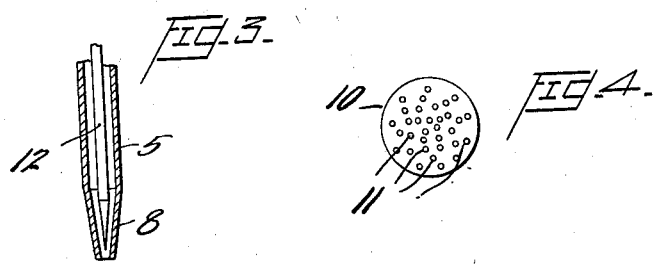

2,340,205

UNITED STATES PATENT OFFICE 2,340,205

MIXING APPARATUS

David W. Pinkerton, Eustis, Fla.

Application December 10, 1942, Serial No. 468,539

5 Claims. (Cl. 299—84)

This invention relates to mixing apparatus of the type intended for adding soluble or insoluble ingredients to a flowing stream of liquid, such as water. Such type of mixer will find utility for the purpose of supplying plant foods to the water used for irrigating or sprinkling plants, flowers, trees, etc. as more fully described in my co-pending application Serial No. 363,346 (now Patent No. 2,304,846 dated December 15, 1942).

An important object of the present invention is to provide a mixing apparatus including a receptacle adapted to contain a supply of selected material, such as a soluble plant fertilizing material, the apparatus being so constructed and arranged for connection with a hose, pipe or other conduit in such a manner that a portion of the liquid flowing through the conduit is diverted under pressure through the receptacle where it forms a concentrated solution with the material and displaces an equal volume of concentrated solution into the main liquid stream.

For better accomplishing the foregoing purpose, I propose to provide in a mixing apparatus of the above character, means for injecting the diverted stream of liquid into the bottom part of the receptacle under pressure to insure a thorough admixture of the liquid with the more heavily laden solution occupying that part of the receptacle.

Another object of the invention is to provide in a mixing apparatus of the above character means for regulating the supply of water diverted through the receptacle.

Still another object of my invention is to provide a mixing apparatus of the above character of relatively simple construction and capable of being manufactured at small cost.

Other objects and advantages will be apparent from the following detailed description of a preferred embodiment of the invention, reference being had to the annexed drawing in which:

Figure 1 is a vertical cross-sectional view through a mixing apparatus adapted to introduce ingredients into a flowing stream of liquid;

Figure 2 is a side view of a mixing apparatus representing a modification of the apparatus of Fig. 1;

Figure 3 is a fragmentary longitudinal cross-sectional view through the lower end of the diversion tube of the apparatus of Fig. 2 and showing the valve for controlling its outlet; and Figure 4 is a plan view of the turbulence-producing disk forming a part of the apparatus of Fig. 2.

The two forms of mixing apparatus shown in the drawing are especially well-suited for connection in circuit with a hose or pipe used for sprinkling lawns or irrigating orchards for the purpose of adding plant foods to the sprinkling or irrigating water.

The apparatus of Fig. 1 comprises a receptacle 1, such as a glass mason jar, having a metal cover 2 which screws onto and closes the opening in its upper end through which a supply of soluble plant food F may be introduced into the bottom of the receptacle. Secured to the cover 2 is a T-fitting 3, the horizontal arms 3a and 3b of which at opposite ends are arranged so as to be coupled in circuit with a conduit C connected with a source of water supply under pressure for causing a flow in the direction indicated by the arrows. The branch 3c of the fitting leading off from the junction of the arms 3a and 3b extends downwardly through an opening in the cover 2 and is secured to said cover by clamping nuts 4 exteriorly threaded upon the branch and engaging opposite faces of the cover.

A diversion tube 5 extends centrally downward to a point adjacent the bottom of the receptacle and the upper end of this tube is bent at approximately right-angles so as to project within the arm 3b in an opposite direction to the current. The diameter of the diversion tube is relatively small compared to the diameter of the arm and branch of the T-fitting and the tube may be supported in position by means of a spider 6.

In advance of the spider and surrounding the inlet end of the tube is a loose packing of bronze wool 7 which has the effect of creating a turbulent friction head which causes a part of the main current of water flowing into the arm 3b of the fitting to pass into the inlet end of the tube 5 and discharge from its lower end into the bottom of the receptacle. The bronze wool retards but does not prevent the flow of the current on through the arm 3a, by-passing the receptacle 1. By varying the amount of bronze wool or by increasing or decreasing the density of its packing, more or less of the water in the main stream may be diverted through the receptacle.

The water entering the tube 5 discharges from its lower end near the bottom of the receptacle wherein is located the most saturated body of solution, and this concentrated solution is displaced upwardly through the branch 3c and enters the main stream of the water. In order to stir up the solution at the bottom of the receptacle and to promote the entry of the plant food into solution with the clear water discharged from the tube, the discharge end of the tube is fitted with a nozzle 8 which constricts the inner diameter of the tube and causes the water to be forcibly discharged therefrom at increased velocity in a downwardly directed jet. Such agitation is beneficial for the reason that the clear water emerging from the tube, because it is of less specific gravity than the saturated solution at the bottom of the receptacle, ordinarily tends to rise and pass out into the main stream without taking up its proper proportion of plant food, whereas the forcible discharge of the water from the tube promotes the dispersal of the clear water throughout the concentrated solution. Desirably the nozzle 8 will be suitably designed so that its flow characteristics will be equal to the flow characteristics of the bronze wool so as to produce a suitably proportioned or balanced flow through the receptacle with reference to the main body of the stream.

In Fig. 2 is shown a slightly modified form of my mixing apparatus, corresponding parts of the apparatus being referred to by the same reference numerals as were employed in connection with Fig. 1. Instead of extending inside of the arm 3b of the T-fitting, the upper end of the diversion tube 5 is arched, as indicated at 5a, so as to project through the top of the fitting and make connection through a coupling 9 with the arm 3b at a point upstream. Instead of utilizing bronze wool for creating turbulent friction, there is press-fitted in the arm 3b, at a point to the rear of the connection of the arched tube section 5a with the arm, a disk 10, more clearly shown in Fig. 4, provided with a multitude of perforations 11. The disk 10, like the bronze wool of the embodiment of Fig. 1, creates a friction head that causes diversion of a portion of the stream of water through the receptacle 1.

Another feature of this modified form of mixing apparatus is the provision of a needle valve for varying the size of the discharge opening at the lower end of the tube 5 as indicated in Fig. 3. The needle valve comprises a rod 12 extending axially within the tube 5 throughout its straight vertical portion, the upper end of this rod being exteriorly screw-threaded and engaging a complementary screw-threaded opening in a cap 13 located at the junction of the arched portion 5a with the straight portion 5 of the tube. The rod projects beyond the cap and carries a finger piece 14 for rotating the rod to screw it upwardly or downwardly. The lower end of the rod (see Fig. 3) is pointed and is adapted to be adjusted into and out of the constricted nozzle end 8 of the tube. Thus by rotating the rod by the finger piece the size of the nozzle opening may be varied to change the proportion of water diverted through the receptacle.

Manifestly various other changes in arrangement and design may be made in the forms of the apparatus herein disclosed without departing from the spirit or essential characteristics of my invention as defined by the following claims.

I claim:

1. A mixing apparatus comprising a receptacle, a removable closure to permit introducing material into the receptacle, a fitting having ends adapted to be coupled in circuit with a conduit connected with a source of liquid under pressure, a port providing communication between said fitting and the top of the receptacle, a tube extending through said port to a position adjacent the bottom of the receptacle, said tube being of substantially smaller diameter than said port and having its upper inlet end communicating with the fitting at a point between the port and the inlet end of the fitting, means for producing a frictional head in the fitting between the tube inlet and the said port for diverting into the tube a portion of the liquid flowing through the conduit, and a nozzle at the lower end of the tube constricting its outlet and increasing the velocity of the liquid discharged therefrom.

2. A mixing apparatus comprising a receptacle, a removable closure to permit introducing material into the receptacle, a T-fitting adapted to be coupled in circuit with a conduit connected with a source of liquid under pressure, a branch leading off from the fitting and communicating with the top of the receptacle, a tube extending through said branch to a position adjacent the bottom of the receptacle, said tube being of substantially smaller diameter than said branch and having its upper inlet end communicating with the fitting at a point between the inlet of said fitting and the branch, means for producing a frictional head in the fitting between the branch and the tube inlet for diverting into the tube a portion of the liquid flowing through the conduit, a nozzle at the lower end of the tube constricting its outlet, and a valve for varying the size of the outlet to change the quantity and velocity of the liquid discharged therefrom.

3. A mixing apparatus comprising a receptacle, a removable closure to permit introducing material into the receptacle, a T-fitting adapted to be coupled in circuit with a conduit connected with a source of liquid under pressure, a branch leading off from the fitting and communicating with the top of the receptacle, a tube extending through said branch to a position adjacent the bottom of the receptacle, said tube being of substantially smaller diameter than said branch and having its upper inlet end communicating with the fitting at a point between the inlet of said fitting and the branch, means for producing a frictional head in the fitting between the tube inlet and the branch, for diverting into the tube a portion of the liquid flowing through the conduit, a nozzle at the lower end of the tube constricting its outlet and a needle valve extending interiorly of the tube to a position exteriorly of the receptacle for adjusting the size of the outlet and varying the quantity and velocity of the liquid discharged therefrom.

4. A mixing apparatus comprising a receptacle, a removable closure to permit introducing material into the receptacle, a port opening into the top of the receptacle and also opening into a conduit carrying liquid connected with a source of liquid under pressure, a tube communicating with the conduit at a point between the port and the inlet of the said conduit and extending inside the receptacle to a position adjacent the bottom of the receptacle, said tube having a constriction at its lower end causing the velocity of the liquid discharged therefrom to be increased, and means for producing a substantial friction head in the conduit at a point between the port and the entrance of the tube, for diverting into the tube a portion of the liquid flowing through the conduit.

5. A mixing apparatus comprising a receptacle, a removable closure to permit introducing material into the receptacle, a port opening into the top of the receptacle and also opening into a conduit carrying liquid connected with a source of liquid under pressure, a tube communicating with the conduit at a point between the port and the inlet of the said conduit and extending inside the receptacle to a position adjacent the bottom of the receptacle, said tube having a constriction at the lower end causing the velocity of the liquid discharged therefrom to be increased, a needle valve extending interiorly of the tube from the constriction to a position exteriorly of the receptacle for adjusting the size of the outlet and varying the quantity of liquid discharged therefrom, and means for producing a substantial friction head in the conduit at a point between the port and the entrance of the tube for diverting into the tube a portion of the liquid flowing through the conduit.

DAVID W. PINKERTON.